March 4, 1952 R. E. WEISER 2,588,187
TWO-SPEED PLANETARY TRANSMISSION
Filed July 1, 1949
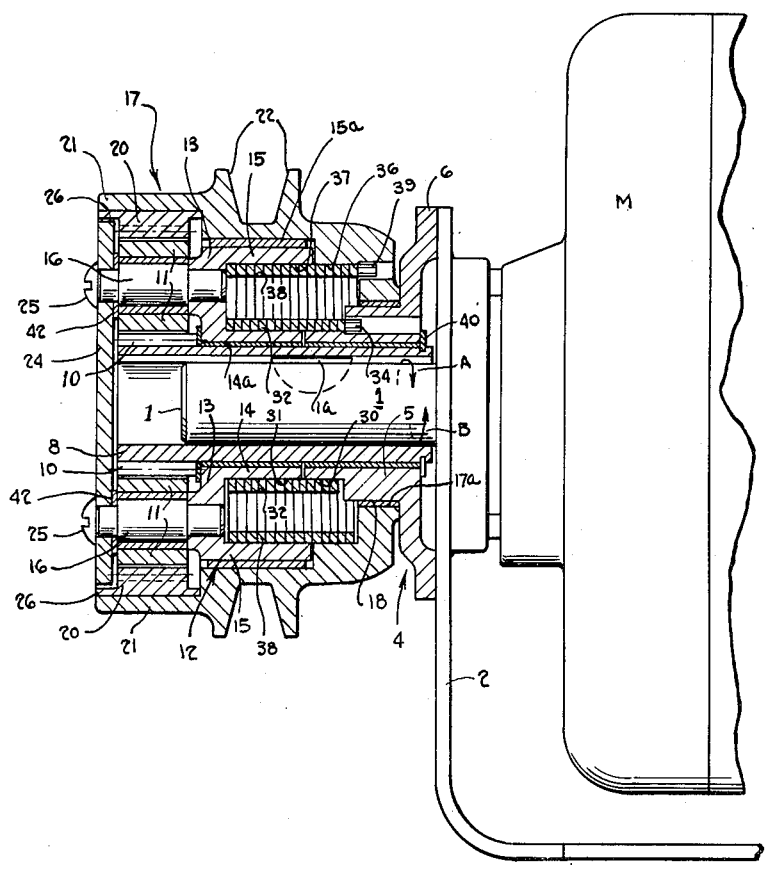
INVENTOR.
ROBERT E. WEISER
BY
George M. Soule
ATTORNEY Patented Mar. 4, 1952

2,588,187

UNITED STATES PATENT OFFICE 2,588,187

TWO-SPEED PLANETARY TRANSMISSION

Robert E. Weiser, Indianapolis, Ind., assignor, by mesne assignments, to The Marquette Metal Products Company, Cleveland, Ohio, a corporation of Ohio Application July 1, 1949, Serial No. 102,593

2 Claims. (Cl. 74—789)

The invention relates to an improved two speed ratio unidirectional drive transmission mechanism capable of being operated selectively to cause an output element to be turned at one speed or the other as desired simply by reversing the direction of power input.

The mechanism comprises, briefly, a driving sun gear member (for attachment, for example, to the rotor shaft of a reversible electric motor), a revoluble planet carrier with planetary gears or pinions thereon in constant mesh with the sun gear and with a coaxial driven or output ring gear; and two overrunning helical spring clutches, one of which, on operation of the sun gear in one direction, automatically couples the planet carrier to a fixed reactance member for deriving one output speed and the other of which, on reverse rotation of the sun gear, automatically causes all the gears to turn as a unit without relative rotation for deriving the other output speed. The spring clutches are so applied that the mechanism is or may be very compact; the various parts including the clutch elements are easy to install, and their operation is efficient and positive.

The above outline descriptions indicate the principal objects of the invention. Others will be made apparent below.

The drawing, as a suitable or typical specific form, shows the transmission mechanism in central longitudinal section, all the essential rotatable parts being substantially of circular and generally cylindrical form.

M represents one end portion of a reversible electric motor or its housing from which the usual takeoff or drive shaft 1 extends. A bracket 2 which may be part of the motor housing or rigid therewith carries a fixed or non-rotatable reactance member 4 having a tubular central portion 5 around the shaft 1 and a supporting or attaching flange 6 adapted to be secured as by bolts or screws (not shown) to the bracket 2. Within the tubular or sleeve portion 5 of the reactance member 4 and extending from it along the shaft 1, keyed thereto as shown at 1a is a driving sleeve 8 having sun gear teeth 10 formed thereon.

The planet gears or pinions 11, of which there may be any suitable number, are in constant mesh with the sun gear; and their carrier is a wheel 12 concentric with the sun gear and having a main disc portion 13, a tubular hub portion 14 rotatably supported at 14a by the driving sleeve 8 and a rim portion 15 of cylindrical drum form lying some distance outwardly from the hub portion and enveloping it in concentric relation thereto and forming therewith an annular pocket. The planet gears or pinions 11 are rotatably supported on parallel stub shafts or studs 16 projecting from and operatively integral with the disc portion 13 of the planet carrier wheel.

The driven or output member of the assembly is shown in the form of a hollow pulley 17 supported for free rotation partly at 17a on a relatively enlarged cylindrical portion 18 of the reactance member 4 and similarly at 15a on the rim or drum portion 15 of the planet carrier wheel 12. The relatively rotatable parts above described have suitable bearings which, as clearly indicated by the drawing, may be bushings.

The driven or output ring gear 20 which is in constant mesh with the planet pinions 11, is rigid (as by press fit) with a tubular portion 21 of the pulley 17 outwardly beyond the bearing support 15a of the pulley and its belt-driving flanged portion 22, shown of well known V-type.

A circular cover plate 24 for the gearing and which serves to maintain the planet gears in place is mounted on the free ends of the pinion-supporting stubs 16 as by screws 25. The cover extends close to but out of contact with a stepped shoulder portion 26 of the ring gear 20 so that the gear elements are adequately guarded but readily subject to inspection and service as for lubrication.

The external peripheral surfaces 30 and 31 respectively of the fixed sleeve 5 and carrier hub 14 which lie axially adjacent each other form approximately equal diameter drum surfaces for cooperation with a contracting type helical torque transmitting member 32 which serves as a brake in this case. One end of the spring 32 is anchored to the reactance member 4 as by a toe 34 of the spring. The other end of the spring is connected only frictionally with its associated drum and one or more of the coils at the free end bear continually on the drum surface 31 with sufficient pressure for causing self-energization of the various coils into gripping relation to both drum surfaces 31 and 30. The spring 32 is, for example, left hand wound.

Internal cylindrical surfaces 36 and 37 of the pulley 17 and planet carrier rim 15 respectively are clutch drum surfaces bridged by a helical clutch spring 38 which is anchored as by a toe 39 to the pulley in an opening of the pulley end portion and has one or more of its free end coils in self-energizing relation to the drum surface 37 as in the case of spring 32. The spring 38 is wound the same as spring 32, e. g. left hand.

To assemble the unit, assuming the helical springs 32 and 38 have been placed in the annular pocket of the planet carrier against its drum surfaces 31 and 37, the pulley 17 and then the reactance member 4 can be slipped into place (right toward left) in telescoping relation to the respective helical springs, the anchor holes for the spring toes (not indicated) being easily positioned to receive the toes. The driving sleeve 8 is then inserted from the left into the assembly comprising carrier 12, reactance member 4, etc. and secured as by a snap ring 40 shown at the right end of the sleeve. The planet gears can then (or previously) be slipped over their supporting stubs 16 and finally the whole mechanism made unitary by securing the plate 24 on the stubs 16. Distance washers or shims 42 are preferably interposed between the cover plate and planet gears as indicated.

In operation, assuming the motor drive shaft 1 is being rotated according to arrow A, turning of the sun gear 10 clockwise as viewed from the left end of the unit (hence tending to turn the planet gears 11 counterclockwise) causes or tends to cause imposition of torque on the planet carrier 12, through the stubs 16, in a clockwise direction. The inner helical spring 32, being left hand wound and self-energized, now wraps tightly on the drum surfaces 31 and 30 to prevent rotation of the planet carrier, causing the ring gear 20 hence the pulley 17 to turn at a reduced speed in reference to the drive shaft but reverse thereof or counterclockwise. In the meantime the coils of the clutch spring 38 which are adjacent the planet carrier drum surface 37 overrun thereon since the counterclockwise rotation of the pulley 17 to which the clutch spring 38 is fixed tends to contract the spring coils.

When the motor drive shaft 1 is reversed, as indicated by arrow B thereon, the planet carrier 12 is rendered free to turn therewith (counterclockwise when viewed as before) by automatic release of the carrier drum surface 31 from gripping restraint of the helical spring 32 which now overruns freely on said drum surface. Meanwhile attempted counterclockwise overrunning rotation of the planet carrier 12, such as would enable the planet gears 11 to revolve idly without transmitting motion to the ring gear 20 and the pulley 17, is prevented by expansion of the coils of the clutch spring 38 against the drum surface 37, reactance at the anchored end of the spring being furnished by the load resistance to counterclockwise turning of the pulley 17 or by the inertia of the pulley. Thus all rotary parts of the mechanism now turn bodily with the motor drive shaft at whatever speed it has or in other words the output rotation is in the same direction as previously described but faster.

It will be noted that during low speed drive the relative overrunning speed of the clutch spring 38 and planet carrier rim or drum 15 is fairly low, hence the clutch spring 38 can safely have considerable energizing pressure or static loading on any or all of its coils. Less energizing pressure is advisable in reference to the more rapidly overrunning helical spring 32 to avoid heating; but that spring, serving only as a brake, can be designed for very light duty since the torque required to hold the planet carrier stationary is relatively small.

I claim:

1. A transmission comprising a constant mesh planetary gear system including coaxial and independently rotatable sun gear, ring gear and panetary gear carrier elements, a stationary reactance element concentric with the carrier, and self-energizing, free-overrunning, helical coil spring friction brake and clutch connections respectively between (a) the reactance element and carrier and (b) the carrier element and ring gear element, the transmission operating to effect unidirectional rotation of the ring gear element at different speeds consequent upon turning of the sun gear element in opposite directions the clutch and brake connections comprising two circular drums, both coaxial with and continually connected to the planetary gear carrier element, one an internal drum and the other an external drum, forming an annular pocket, and similarly wound helical friction clutching and braking springs respectively in overrunning self-energizing relationship to the clutch and brake drum and respectively in anchored relationship to the ring gear element and reactance element.

2. A constant mesh planetary transmission mechanism comprising a rotary planet carrier, two gears concentric therewith, a planetary gear element in constant mesh with the two gears, a stationary reactance element concentric with the gears, a pair of coaxial clutch drums connected rigidly with the carrier and one of the gears respectively, a one-way-acting self-energizing helical friction clutch spring bridging the drums and anchored at one end to the gear-connected drum for preventing relative rotation of the gears when input torque to the mechanism is in one direction, a pair of coaxial brake drums rigid with the carrier and the reactance element respectively, and a one-way acting self-energizing helical friction braking spring bridging the brake drums concentric with the clutch spring and anchored at one end to the reactance element for holding the carrier against rotation and enabling planetary action of the gearing when torque input to the mechanism is in the direction opposite to that earlier stated.

ROBERT E. WEISER.

REFERENCES CITED

The following references are of record in the file of this patent:

UNITED STATES PATENTS

| Number | Name | Date |
|---|---|---|
| 2,410,921 | Avila | Nov. 12, 1946 |
| 2,467,627 | Olson | Apr. 19, 1949 |

FOREIGN PATENTS

| Number | Country | Date |
|---|---|---|
| 361,079 | France | Dec. 13, 1905 |
| 514,238 | France | Nov. 13, 1920 |